United States Patent [19]

Schüller et al.

[11] Patent Number: 5,731,647
[45] Date of Patent: *Mar. 24, 1998

[54] HYBRID-ENERGIZED SYNCHRONOUS ELECTRIC MACHINE

[75] Inventors: Uwe Schüller, Ilmenau; Jürgen Brandes, Bad Neustadt, both of Germany

[73] Assignee: Siemens Aktiengesellschaft, München, Germany

[*] Notice: The term of this patent shall not extend beyond the expiration date of Pat. No. 5,672,926.

[21] Appl. No.: 604,137

[22] Filed: Feb. 20, 1996

[30] Foreign Application Priority Data

Feb. 21, 1995 [DE] Germany .................. 195 05 965.4

[51] Int. Cl.⁶ .................................................. H02K 21/04
[52] U.S. Cl. .................... 310/114; 310/156; 310/162; 310/261
[58] Field of Search .................... 310/114, 156, 310/261, 162, 211

[56] References Cited

U.S. PATENT DOCUMENTS

| | | | |
|---|---|---|---|
| 3,555,327 | 3/1969 | Terry | 310/263 |
| 3,743,873 | 7/1973 | de Jong | 310/165 |
| 4,358,696 | 11/1982 | Liu et al. | 310/156 |
| 4,358,697 | 11/1982 | Liu et al. | 310/156 |
| 4,403,161 | 9/1983 | Miyashita et al. | 310/156 |
| 4,486,679 | 12/1984 | Jones | 310/218 |
| 4,559,463 | 12/1985 | Kobayashi | 310/156 |
| 4,564,777 | 1/1986 | Senoo et al. | 310/156 |
| 4,845,837 | 7/1989 | Lloyd | 29/598 |
| 5,097,166 | 3/1992 | Mikulic | 310/156 |
| 5,223,759 | 6/1993 | Shimoda et al. | 310/156 |
| 5,369,325 | 11/1994 | Nagate et al. | 310/156 |
| 5,371,426 | 12/1994 | Nagate et al. | 310/156 |

FOREIGN PATENT DOCUMENTS

| | | |
|---|---|---|
| 0228873 | 7/1987 | European Pat. Off. . |
| 0 620 634 | 10/1994 | European Pat. Off. . |
| 1 488 733 | 6/1969 | Germany . |

*Primary Examiner*—Steven L. Stephan
*Assistant Examiner*—Tran Ngoc Nguyen
*Attorney, Agent, or Firm*—Kenyon & Kenyon

[57] ABSTRACT

A hybrid-energized synchronous machine includes a laminated stator core that is arranged in a magnetic yoke and is divided axially into at least two core halves between which there is a field coil, where the rotor of this machine is also divided in two halves, where each rotor half has pole parts that are provided with permanent magnets and those that are not provided with permanent magnets, where one rotor half is equipped with permanent magnets of one polarity (N) and the other rotor half is equipped with permanent magnets of the other polarity (S), and pole parts of both rotor halves that are equipped with permanent magnets are offset by one pole pitch with respect to each other. The synchronous electric machine is also provided with an electric field coil designed as a ring coil. Both scattering losses and line losses can be reduced due to the fact that rotor halves are arranged on rotor shaft with an axial distance between them, and field coil is inserted into the space between rotor halves. The exciter output needed to regulate the speed and voltage can be reduced by the fact that permanent magnets are inserted into receptacle holes provided in the laminated core of rotor halves, and core parts that are adjacent to the receptacle holes in the direction of the periphery of the rotor are connected to pole parts that are not provided with permanent magnets only by using saturation segments.

9 Claims, 3 Drawing Sheets

HYBRID-ENERGIZED SYNCHRONOUS ELECTRIC MACHINE

BACKGROUND OF THE INVENTION

The present invention is related to U.S. patent application Ser. No. 08/602,484, filed on Feb. 20, 1996, which is titled "Hybrid-Energized Electric Motor" and is hereby incorporated by reference.

The present invention relates generally to hybrid-energized synchronous machines, and more particularly to a hybrid-energized synchronous machine with a laminated stator core that is arranged in a magnetic yoke and is divided axially into at least two core halves between which there is a field coil that is designed as a ring coil, where the rotor is also divided according to the division of the stator core, and each rotor half has pole parts that are fitted with permanent magnets and those that are not fitted with permanent magnets, which are arranged in succession in accordance with the pole pitch, where one rotor half is fitted with permanent magnets of one polarity (N) and the other rotor half is fitted with permanent magnets of the other polarity (S), and pole parts of the two rotor halves that are fitted with permanent magnets are offset with respect to each other by one pole pitch.

Such a machine is known from European patent A 620, 634. With this machine, the permanent magnets are arranged on the circumference of the rotor core. This means that the permanent magnets must be surrounded with banding to secure them adequately against the resulting centrifugal forces. However, such banding causes an increase in the size of the geometric air gap. This also results in an increase in the electric exciter output which serves to regulate the speed and voltage. Furthermore, enlarging the air gap results in greater scattering losses.

The present invention is directed to the problem of developing a machine of the above mentioned type in which a much lower electric exciter output is needed for regulating the speed and voltage.

SUMMARY OF THE INVENTION

The present invention solves this problem by providing that the permanent magnets are disposed into a plurality of receptacle holes that run at least approximately in a circumferential direction, and that core parts that are adjacent to the receptacle holes in the direction of the rotor circumference are connected only by saturation segments to pole parts that are not fitted with permanent magnets.

Due to the arrangement of the permanent magnets in the rotor core, no fastening devices that would increase the size of the air gap are needed. A magnetic short-circuit of the permanent magnets introduced into the receptacle holes is prevented by saturation segments.

A further reduction in scattering losses is achieved due to the fact that the core parts have an increased magnetic resistance in the transverse direction. This can be achieved in a simple way by providing the core parts with slots that run essentially parallel to the magnetic flux passing through them.

Another factor that helps to reduce the scattering losses is that the pole sector corresponding to the pole pitch that follows radially on the inside after each receptacle hole is also provided with slots running essentially parallel to the magnetic flux passing through it.

DETAILED DESCRIPTION

Figure 1:
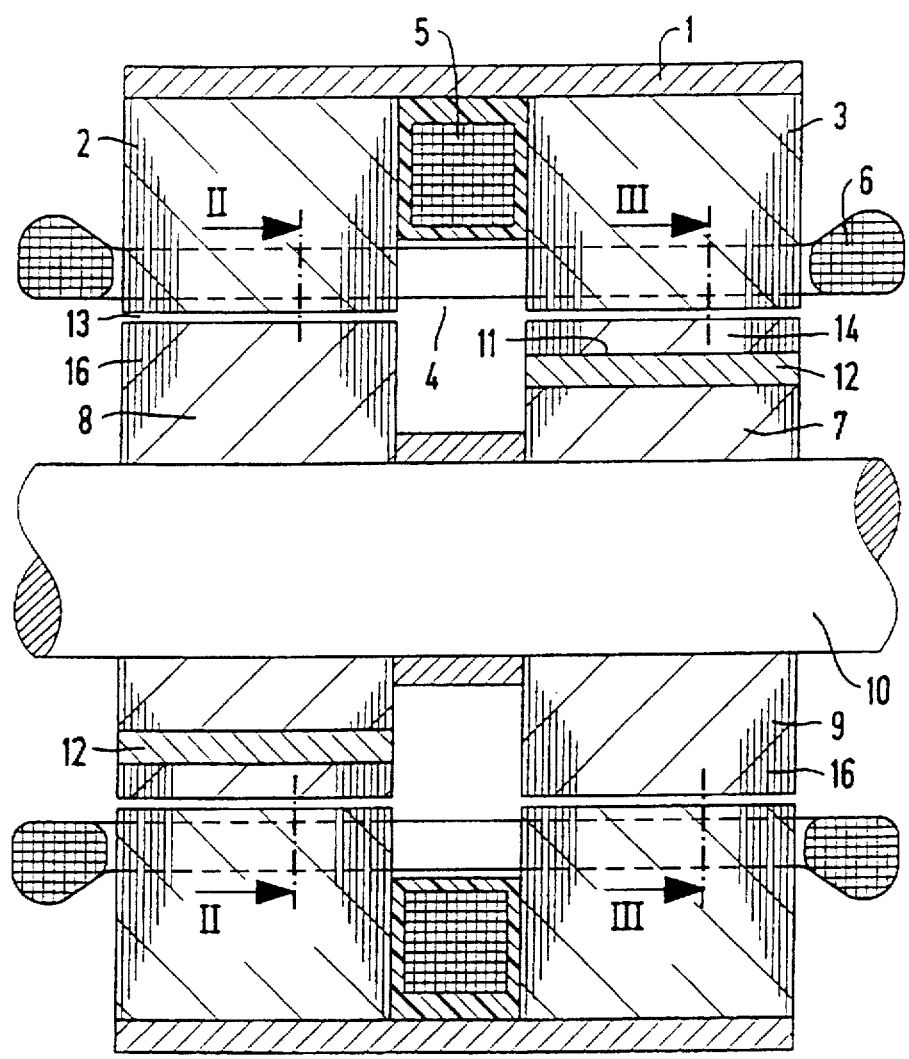
FIG. 1 shows a longitudinal section of a hybrid-energized synchronous machine in a schematic diagram.

The synchronous machine illustrated in FIG. 1 has a laminated stator core that is arranged in a yoke 1 and is divided into two core halves 2 and 3 in the axial direction, where these two core halves 2 and 3 are arranged with an axial spacing between them. An electric field coil 5, which is designed as a ring coil, is inserted into the space 4 thus formed between the two core halves 2 and 3. The stator core is also provided with a conventional stator winding 6.

Rotor 7 of the machine is divided into two rotor halves 8 and 9 in the same way as the stator core. These rotor halves are arranged on rotor shaft 10 with the same axial spacing as the two core halves 2 and 3 of the stator winding. Receptacle holes 11 that extend in a straight line in the circumferential direction are provided in the laminated core of each rotor half 8 and 9 and have permanent magnets 12 inserted into them. Permanent magnets 12 are arranged with regard to their polarity in one rotor half 8 in such a way that their north poles point toward air gap 13 of the machine. In the other rotor half 9, permanent magnets 12 are arranged in such a way that their south poles point toward air gap 13. Permanent magnets 12 of one rotor half 8 are also offset by one pole pitch with respect to permanent magnets 12 of the other rotor half 9.

Figure 2:
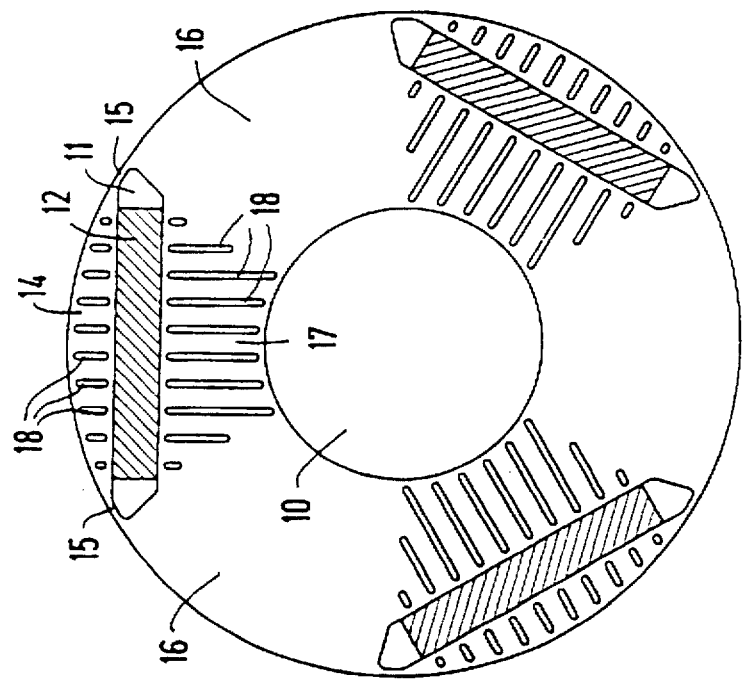
FIG. 2 shows a sectional view of the rotor of the synchronous machine along line II—II in FIG. 1.
Figure 3:
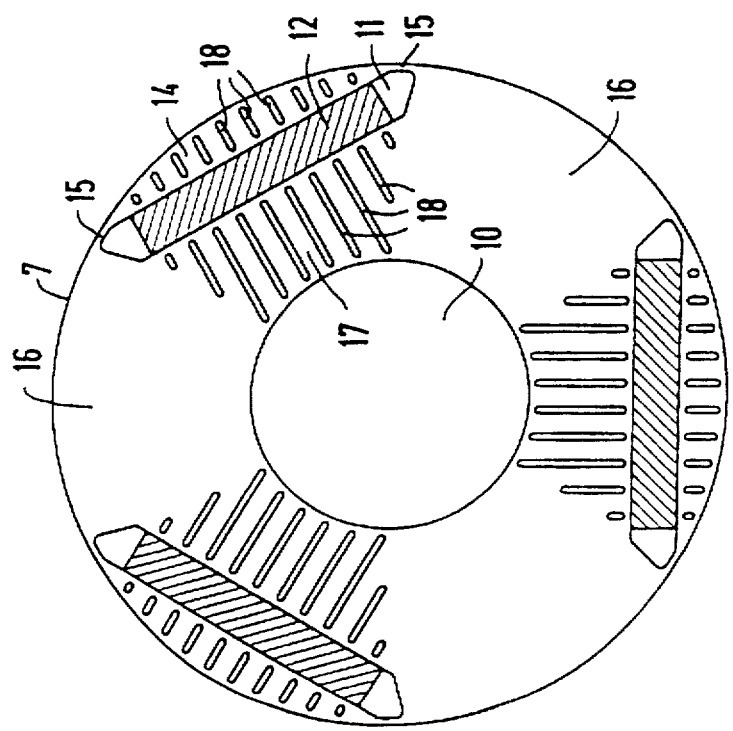
FIG. 3 shows a sectional view of the rotor of the synchronous machine along line III—III in FIG. 1.

As shown by FIGS. 2 and 3, core parts 14 of the laminated core of respective rotor halves 8 and 9 that extend over one pole pitch and follow receptacle holes 11 on the outer side radially are connected by narrow saturation segments 15 to neighboring pole parts 16 that are not fitted with permanent magnets. Pole parts 16 also extend over one pole pitch on the peripheral side. Saturation segments 15 provide mechanical support for core parts 14 while also preventing a magnetic short-circuit of permanent magnets 12 inserted into receptacle holes 11. The arrangement of permanent magnets 12 in the laminated core provides a high level of mechanical security with regard to the centrifugal force that occurs with the rotational movement of rotor 7. Thus, such a rotor is also suitable for very high speeds.

Slots 18 that run essentially parallel to the magnetic flux passing through these parts are provided in core parts 14 and pole sectors 17 that follow receptacle holes 11 on the inside radially toward rotor shaft 10. The magnetic resistance in the direction transverse to the magnetic flux is thus essentially increased by these slots 18 and thus the scattering losses are reduced.

Figure 4:
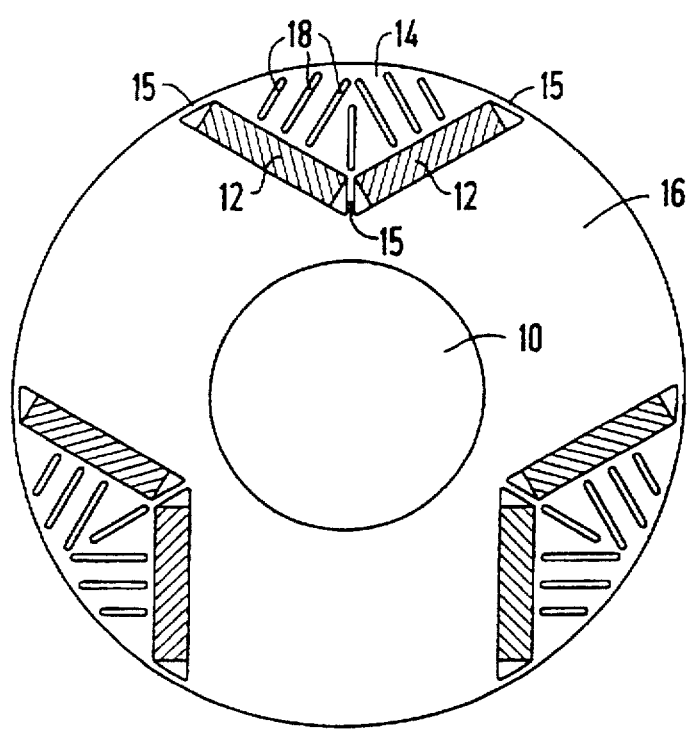
FIG. 4 shows another possible arrangement of permanent magnets in the rotor core.

FIG. 4 shows another variant of the arrangement of permanent magnets 12 in the laminated core of rotor halves 8 and 9. Due to the inclined position of permanent magnets 12, more magnetic material can be accommodated in the laminated core.

Since permanent magnets 12 are accommodated in receptacle holes 11 of the laminated rotor core, rotor halves 8 and 9 have a uniform surface, so the size of air gap 13 of the machine is determined only by mechanical factors. Air gap 13 can thus be designed as a small gap accordingly, so the electric exciter output of field coil 5 that is necessary for regulating the speed and voltage of the machine is also reduced.

A magnetic flux that either increases or reduces the magnetic flux of permanent magnets 12 can be generated by means of field coil 5 that is supplied with a direct current. This yields a large control range for the speed or voltage of the machine.

What is claimed is:

1. A hybrid-energized synchronous machine comprising:
   a) a magnetic yoke;
   b) a laminated stator core being arranged in the magnetic yoke and being divided axially into at least two core halves, said halves forming a space therebetween;
   c) a field coil in a ring form being disposed in the space between the core halves;
   d) a rotor being divided into a first rotor half and a second rotor half corresponding to the at least two core halves, each rotor half having a plurality of permanent pole parts that are fitted with a plurality of permanent magnets and a plurality of non-permanent pole parts that are not fitted with permanent magnets, the plurality of permanent and non-permanent pole parts being arranged in succession corresponding to a pole pitch, wherein the plurality of permanent magnets in the first rotor half have a first polarity (N) and the plurality of permanent magnets in the second rotor half have a second polarity (S), and the plurality of permanent pole parts of the first rotor half is offset with respect to the second rotor half by one pole pitch;
   e) a plurality of receptacle holes in each of the first and second rotor halves into which the plurality of permanent magnets are inserted, wherein the receptacle holes run at least approximately in a circumferential direction; and
   f) a plurality of saturation segments in each of the first and second rotor halves, wherein the plurality of permanent pole parts in each of the first and second rotor halves that are adjacent to the plurality of receptacle holes in each of the respective rotor half in a direction of rotor circumference are connected only by the plurality of saturation segments to the plurality of non-permanent pole parts in the other rotor.

2. The machine according to claim 1, wherein the plurality of permanent pole parts have a greater magnetic resistance in a transverse direction.

3. The machine according to claim 2, wherein the plurality of permanent pole parts include a plurality of slots that run essentially parallel to a magnetic flux extending through them.

4. The machine according to claim 1, further comprising a pole sector, which corresponds to a pole pitch and follows each receptacle hole on an inside radially, and is also provided with a plurality of slots that run essentially parallel to a magnetic flux extending through it.

5. The machine according to claim 2, further comprising a pole sector, which corresponds to a pole pitch and follows each receptacle hole on an inside radially, and is also provided with a plurality of slots that run essentially parallel to a magnetic flux extending through it.

6. The machine according to claim 3, further comprising a pole sector, which corresponds to a pole pitch and follows each receptacle hole on an inside radially, and is also provided with a plurality of slots that run essentially parallel to a magnetic flux extending through it.

7. The machine according to claim 3, wherein the plurality of slots are arranged substantially near a shaft.

8. The machine according to claim 4, wherein the plurality of slots are arranged substantially near a shaft.

9. The machine according to claim 5, wherein the plurality of slots are arranged substantially near a shaft.

* * * * *